United States Patent
Swoboda et al.

(10) Patent No.: US 10,340,957 B2
(45) Date of Patent: Jul. 2, 2019

(54) METHODS AND DEVICES FOR MONITORING OPTICAL SIGNALS

(71) Applicant: Avago Technologies International Sales Pte. Limited, Singapore (SG)

(72) Inventors: Robert Swoboda, Vienna (AT); Santosh Dwivedi, Regensburg (DE)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/337,801

(22) Filed: Oct. 28, 2016

(65) Prior Publication Data
US 2018/0123688 A1 May 3, 2018

(51) Int. Cl.
*H04B 1/00* (2006.01)
*H04B 10/69* (2013.01)
*H04B 10/079* (2013.01)

(52) U.S. Cl.
CPC ....... *H04B 1/0007* (2013.01); *H04B 10/0795* (2013.01); *H04B 10/69* (2013.01); *H04B 10/693* (2013.01)

(58) Field of Classification Search
None
See application file for complete search history.

(56) References Cited

U.S. PATENT DOCUMENTS

| 5,168,528 A * | 12/1992 | Field, Jr. ............... G01S 3/7865 250/332 |
| 5,917,346 A | 6/1999 | Gord |
| 6,693,734 B2 * | 2/2004 | Il ........................... G02F 1/0123 359/238 |
| 9,319,034 B2 | 4/2016 | Kidd et al. |
| 2015/0303905 A1 * | 10/2015 | Kidd ..................... H03K 3/017 327/174 |

* cited by examiner

*Primary Examiner* — Darren E Wolf
(74) *Attorney, Agent, or Firm* — Sheridan Ross P.C.

(57) ABSTRACT

A method, system, and computer readable medium are provided for monitoring a signal source. The illustrative method includes receiving an analog signal from the signal source, converting the analog signal into a digital signal having a frequency that is representative of an amplitude of the analog signal, and monitoring at least one parameter of the analog signal by counting features of the digital signal or time-measuring a distance between the features of the digital signal.

20 Claims, 10 Drawing Sheets

Related Art

METHODS AND DEVICES FOR MONITORING OPTICAL SIGNALS

FIELD OF THE DISCLOSURE

The present disclosure is generally directed toward methods and devices for monitoring optical signals.

BACKGROUND

Optical link monitoring solutions use current interfaces and current-to-voltage conversion with a resistor followed by an analog to digital converter (ADC). FIG. 1 illustrates such a related art system 50 that includes a receiver 55 (e.g., optical receiver that senses light using a photo detector), an ADC 60, and a resistor R1. The resistor R1 converts a monitoring current Im into a monitoring voltage Vm. The ADC 60 converts the voltage Vm into a digital signal that is used (e.g., by a digital signal processor (DSP)) for further processing. One disadvantage of this approach is that for a high optical dynamic range (e.g., greater than 30 dB) of the receiver 55, the voltage range prior to the ADC 60 is even higher (e.g., greater than 1000:1 or 60 dB) for the current, or a factor of two in dB, compared to optical power due to the quadratic characteristic of the photo detector. Furthermore, due to linearly sized steps of the ADC 60, low voltages are sampled too coarsely while high voltages (for high optical power) are sampled too finely. Thus, to accurately measure the low monitoring currents, a large overhead of bits of the ADC 60 is used or the ADC 60 employs special range switching features, both of which increase cost.

The low current detected by the receiver 55 can be on the order of 1 uA or even lower for a high dynamic range receiver if the upper limit is fixed or limited to low power applications. However, low cost ADCs, such as those implemented in related art systems, usually have high leakage current (e.g., on the same order as the lowest measurable current of the receiver 55) and additionally have a limited number of bits (e.g., about 10-12 bits or 1024-4096 steps) for the conversion, which makes them unsuitable for low cost, high dynamic range applications. Further, often more than one parameter (besides current) is to be measured (e.g., average power, modulation power, etc.), which further complicates the system by adding multiple ADCs or multiplexers, which also have high leakage current in the low cost range. An additional disadvantage is the sensitivity to electromagnetic interference (EMI), since for low currents the voltage can go below 1 mV.

Another approach is to measure the current by using a low cost processor or microcontroller, but this approach has computational costs and associated inaccuracies of the measurement. This is because microcontroller based measurement is done with help of software or hardware interrupts. Edges of a signal being monitored are detected with interrupts and a timer is used to calculate time taken between edges. The interrupt and timer based traditional approach has following disadvantages, especially on 8 bit microcontroller with 16 bit timers: 1) interrupts are an overhead as for every interrupt normal program flow switches to interrupt execution—thus, regular incoming interrupts may affect other protocols handled by microcontroller measuring the frequency; 2) time recording done in interrupt may have latencies if a high priority interrupt is already in processing, which leads to inaccurate time stamp recording; and 3) 16 bit timer registers overrun for lower frequencies as the timer is configured with microsecond resolution. If timer resolution is reduced, frequency measurement accuracy is severely compromised, especially in the high frequency range. Timer overflow handling may be achieved with timer overflow interrupts, which causes even more system load affecting time critical protocols running on the microcontroller.

BRIEF DESCRIPTION OF THE DRAWINGS

The present disclosure is described in conjunction with the appended figures, which are not necessarily drawn to scale.

DETAILED DESCRIPTION

At least one example embodiment addresses the problem of coarse and inaccurate monitoring of low level signals in optical receivers and uses low cost components.

That is, example embodiments offer a robust way to transmit analog monitoring information to digital circuits with high resolution and dynamic range. Furthermore, the complexity of the analog sensing principle is shifted to digital side. On the receiver side, the conversion is made as simple as possible to save chip area and current consumption since the technology is not as advanced on the receiver side as on the digital processing side (e.g., at a microcontroller). Further an ADC is not needed on the digital side, which offers more possibilities for selecting the most cost effective technology. Further, an advantage of frequency measurement is that frequency calculation does not affect parallel running standard protocols on the microcontroller and avoids latencies caused by interrupts because the approach uses no interrupt for frequency counting.

To achieve high resolution with a simple and low cost design, the monitoring current is converted to a frequency signal. This frequency signal can be transmitted by standard logic signals to digital time-measuring and/or counting devices in the digital part (e.g., a microcontroller or digital signal processor (DSP)). The frequency can have a very large dynamic range (e.g., greater than 1000000:1) and is very robust against interference. Furthermore, adaptive measurement can be implemented (e.g., low frequencies use time measurement and high frequencies use simple counting) for an optimum conversion time for maximum resolution. This provides the benefit of very high resolution over the full high dynamic range at a low cost. To avoid interference from the digital signal, the edge speed can be controlled. Therefore, for low signal levels when the receiver is very sensitive to supply noise or EMI, the edge speed can be made very low. On the other hand, for high incoming and measured signals the receiver is robust anyway and the transmitted frequency is high, therefore the edge speed can be increased adaptively for expanding the dynamic range. To achieve this optional adaptive edge speed, the measured current is also coupled to output driver with slew rate control. With a function generator, any characteristic behavior of the edge speed control can be realized (e.g., leaving the edge speed for a wide range of low input currents low and increase the edge speed only for very high currents (→high frequencies) to allow clean detection together with a large range of low EMI emissions of the digital connection).

Figure 4:
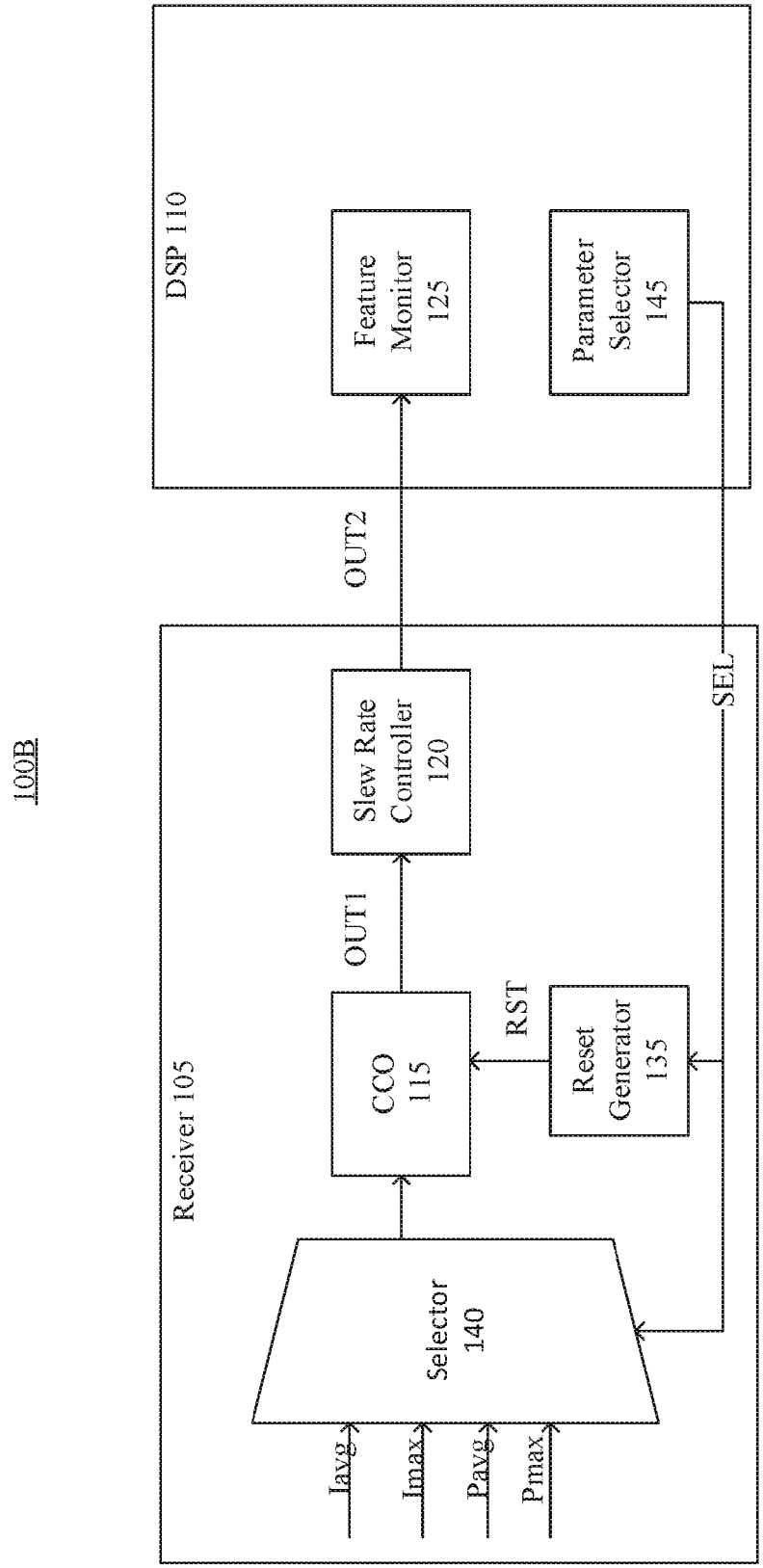
FIG. 4 illustrates yet another example system for monitoring optical signals according to at least one example embodiment.

Multiple parameters (e.g., monitoring currents) can also be sensed with one frequency interconnection by multiplexing the current input of the current to frequency converter (FIG. 4). One or more digital or multilevel signals from the digital part can be used to select the needed parameter for conversion. To optionally decrease conversion time especially for low current (or low frequency) signals, with every change of selection, the current to frequency converter can be restarted by an internally generated reset signal and start a new conversion in a defined way. By implementing the reset function, the conversion time for low frequencies can be reduced by up to a factor of two.

To overcome the disadvantages of traditional frequency measurements, at least one example embodiment has a unique approach to measure the frequency which neither uses interrupts of the microcontroller nor affecting the characteristics of parallel running time critical protocols. Additionally, it is also robust against the influence of subsystem software and other hardware modules. For example, a signal to be measured is fed as a clock to a timer unit. Therefore, at each signal rising or falling edge the timer is incremented in the CPU internal memory register. As soon the timer value hits a pre-configured value N, a general purpose output pin is triggered to change its logic level. The general purpose output pin is routed back to the external input capture unit of microcontroller, which is in turn programmed to record the high precision timestamp in the internal register. The state machine operates on the recorded timestamp to find out the signal frequency. The microcontroller selects a parameter to be measured by toggling a general purpose control output logic level and thus can measure multiple parameter frequencies. Consequently, the microcontroller measures the frequency signal while executing state machines and running various protocols in parallel without affecting software sub components and protocol timing characteristics.

While embodiments of the present disclosure will primarily be described in connection with optical receivers, it should be appreciated that example embodiments are not so limited. For example, example embodiments may be used in connection with other applications that utilize signal monitoring. Embodiments of the present disclosure should not be construed as being limited to optical systems. Rather, embodiments of the present disclosure can be applied to any type of circuit element or collection of circuit elements that have similar needs for signal monitoring as those described herein.

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

It should also be appreciated that example embodiments described herein may be implemented in any number of form factors. Specifically, the entirety of the circuits disclosed herein may be implemented in silicon as a fully-integrated solution (e.g., as a single Integrated Circuit (IC) chip or multiple IC chips) or they may be implemented as discrete components connected to a Printed Circuit Board (PCB).

Figure 1:
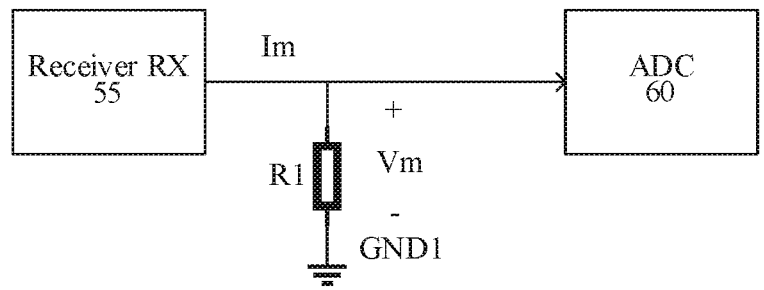
FIG. 1 illustrates a system for monitoring optical signals according to the related art.
Figure 2:
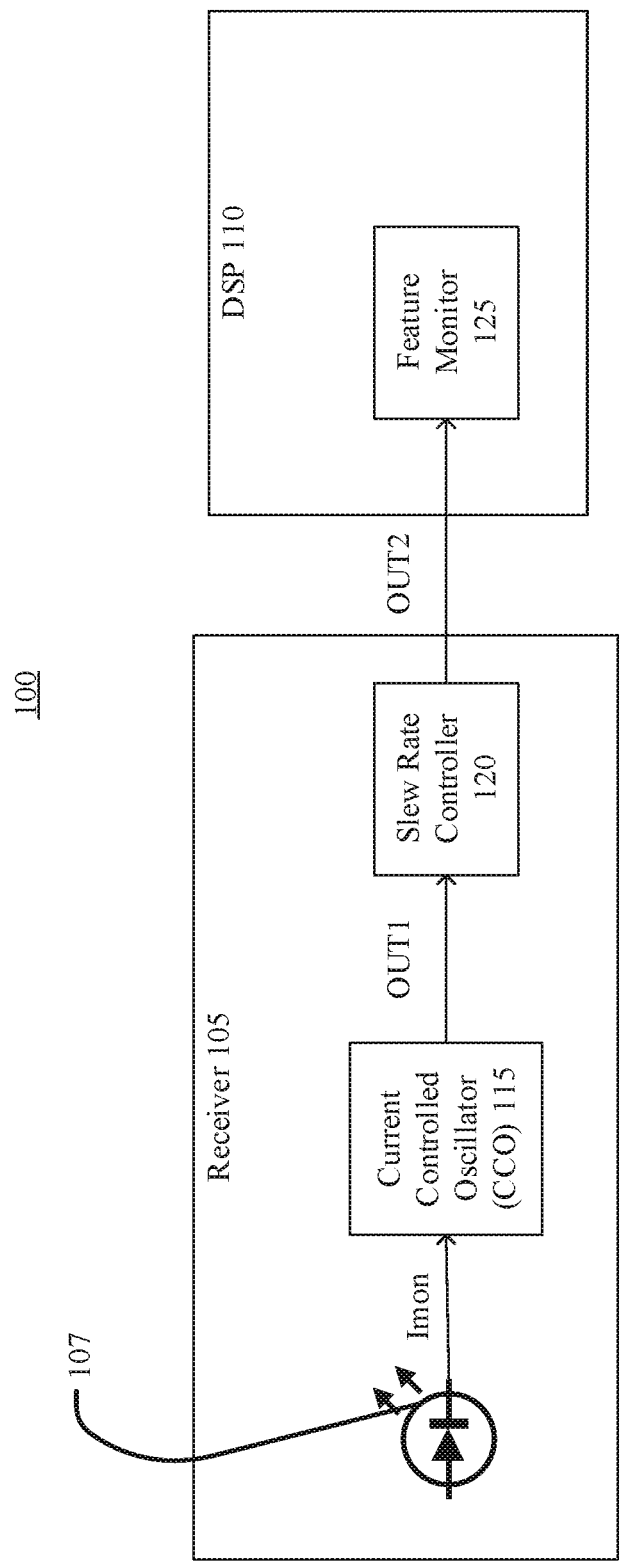
FIG. 2 illustrates an example system for monitoring optical signals according to at least one example embodiment.

FIG. 2 illustrates an example system for monitoring optical signals according to at least one example embodiment.

The system 100 includes a receiver 105 and a DSP (or microcontroller) 110. The receiver 105 may be a receiver integrated circuit (IC) for detecting optical signals with a signal source, for example, an optoelectronic component such as a photo detector 107. The photo detector 107 may be optoelectronic component that converts received light into an analog signal, for example, an analog current signal Imon. The signal Imon is a signal to be monitored by the DSP 110. In general, the receiver 105 converts the signal Imon into a digital signal having a frequency that is representative of an amplitude of the signal Imon. The receiver 105 accomplishes this with the current controlled oscillator (CCO) 115. For example, the CCO 115 receives the analog signal Imon from the photo detector 107, and outputs a digital signal (or first digital signal) OUT1 having a frequency that is representative of the amplitude of the signal Imon.

In one embodiment, the digital signal OUT1 is output to a slew rate controller 120 for adaptively controlling an edge speed of the digital signal OUT1. For example, the slew rate controller 120 controls a slew rate (i.e., rise-time and fall-time of pulses) of the digital signal OUT1 to output another digital signal (or second digital signal) OUT2. It should be understood that the slew rate controller 120 is an optional feature of the system 100 and may be removed or bypassed. That is, in at least one example embodiment, the digital signal OUT1 is input into the DSP 110 without being operated on by the slew rate controller 120. Example circuitry and operations of the receiver 105 are described in more detail below with reference to FIGS. 6-9.

As shown in FIG. 2, the DSP 110 receives an output of the receiver 105 and monitors at least one parameter of the signal Imon using the output of the receiver 105. For example, the DSP 110 includes a feature monitor 125 that receives the second digital signal OUT2 and the monitors at least one parameter of the analog signal Imon by counting features of the second digital signal OUT2 or time-measuring a distance between the features of the digital signal second OUT2. If the slew rate controller 120 is not included or is bypassed, then the feature monitor 125 performs the above described operations on the first digital signal OUT1.

The DSP 110 may be a special purpose processor for executing computer readable instructions stored on a computer readable medium or memory. Examples of a suitable processor include, without limitation, an Integrated Circuit (IC) chip, a CPU, a microprocessor (or microcontroller), and the like. The memory may be volatile or non-volatile in nature. Examples of a suitable memory include, without limitation, flash memory, ROM, RAM, EEPROM, etc. The instructions stored in memory may be executed by the DSP 110 to carry out the functionality of the DSP 110 described herein (e.g., the functionality of the feature monitor 125).

It should be understood that example embodiments are not limited to the structure of DSP 110 discussed above. For example, the DSP 110 may be implemented by a digital state machine comprising digital components such as logic gates. As another example, the DSP 110 may be implemented as an application specific integrated circuit (ASIC).

Figure 3:
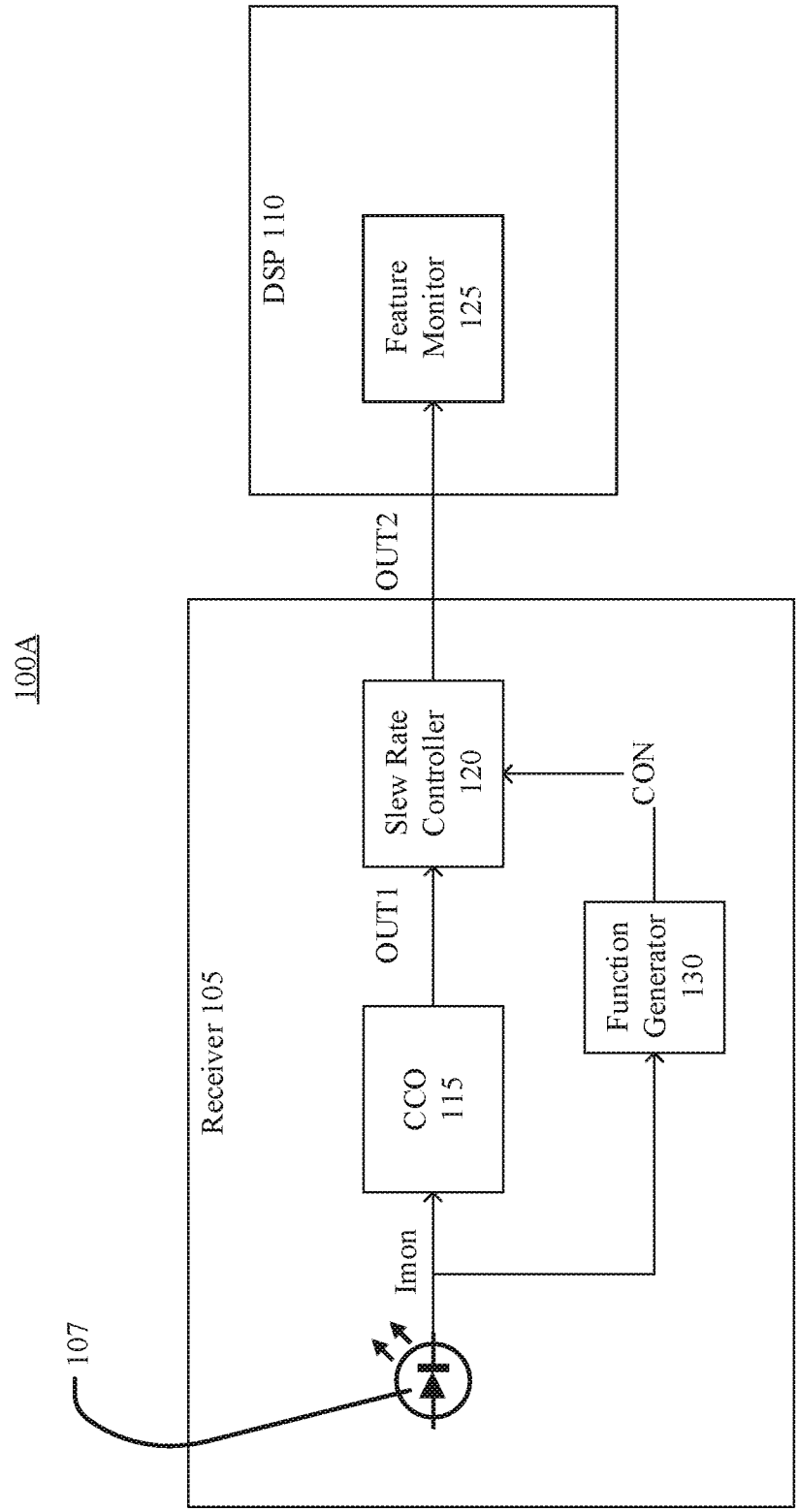
FIG. 3 illustrates another example system for monitoring optical signals according to at least one example embodiment.

FIG. 3 illustrates another example system for monitoring optical signals according to at least one example embodiment. In FIG. 3, system 100A has substantially the same structure as system 100 in FIG. 2 except that the receiver 105 further includes a function generator 130 that receives the analog current signal Imon and outputs a control signal CON to the slew rate controller 120. According to at least one example embodiment, the function generator 130 measures the analog signal Imon (e.g., measure the amplitude of Imon), and generates the control signal CON based on the measurement of the analog signal Imon. Here, the control signal enables CON the adaptive control of the edge speed of the first digital signal OUT1 to output the second digital signal OUT2. Using the function generator 130, any characteristic behavior of the edge speed can be realized. For example, the function generator 130 may generate control signal CON to control the edge speed of the first digital signal OUT1 for a wide range of low input currents of Imon to be low. In another example, the function generator 130 may increase the edge speed of the first digital signal OUT1 for very high currents of Imon to allow clean detection together with a large range of low EMI emissions of the digital connection to DSP 110. With the function generator 130 the behavior of the dependency of the slew rate can be defined, meaning that limits can be applied to meet the interfacing standard in conjunction with EMI quietness. As an example, the following logic has restrictions with slew rate min and/or slew rate max. The function generator 130, in some embodiments, receives the signal which corresponds to the raw measurement signal and generates a signal to the needs of the application (e.g., by clipping or by other nonlinear transformations).

FIG. 4 illustrates yet another example system for monitoring optical signals according to at least one example embodiment. In FIG. 4, system 100B has substantially the same structure as system 100 in FIG. 2 except that receiver 105 further includes a reset generator 135 and a selector 140, and the DSP 110 further includes a parameter selector 145. The system 100B allows for monitoring of multiple candidate parameters of an optical signal from a photo detector (not shown in FIG. 4).

In operation, the parameter selector 145 generates a parameter selection signal SEL, and sends the parameter selection signal SEL to the selector 140. The parameter selection signal SEL may be generated in response to user input or other instruction at the DSP 110 that selects which parameter is a selected parameter.

The selector 140 enables different parameters from among a plurality of candidate parameters to be selected as the selected parameter based on the parameter selection signal SEL. The plurality of candidate parameters may include various parameters of an optical signal from a photo detector (not shown). For example, the plurality of candidate parameters may include two or more of an average current Iavg of the analog signal Imon, a maximum current Imax of the analog signal Imon, an average power Pavg of the analog signal Imon, a maximum power Pmax of the analog signal Imon, etc. In some embodiments, the received optical power with its modulation Poma and Pavg, is converted to the Current Iavg and Ioma with the photo diode. Avg refers to the average of the parameter, whereas oma refers to the modulation amplitude (Optical Modulation Amplitude—OMA). According to at least one example embodiment, the selector 140 comprises a multiplexer. Thus, it may be said that the multiplexer receives the parameter selection signal SEL and, based thereon, selectively controls which among the plurality of candidate monitored parameters is the selected monitored parameter.

The reset generator 135 may determine that the parameter selection signal SEL has been sent to the selector 140, and in response to determining that the parameter selection signal SEL has been sent, reset the current controlled oscillator 115 to a start condition. For example, the reset generator 135 may generate a reset signal RST in response to receiving the parameter selection signal SEL and send the reset signal RST to the CCO 115 to reset the CCO 115 to a start condition.

Figure 5:
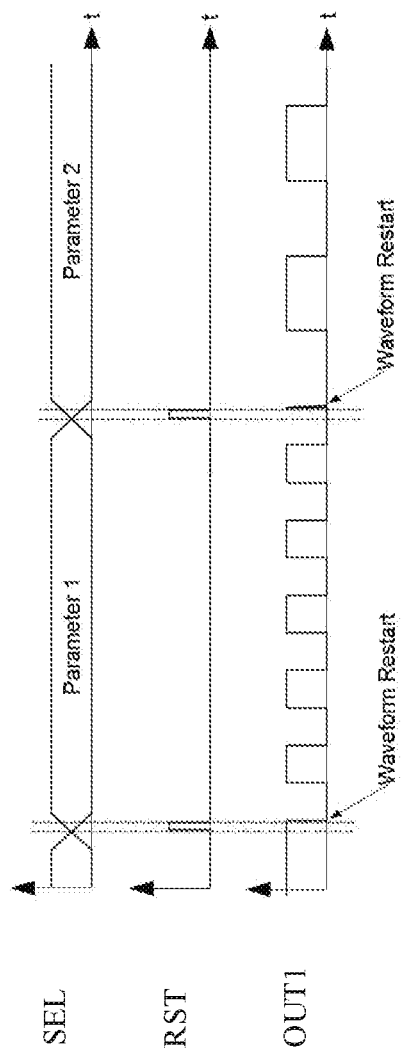
FIG. 5 illustrates an example timing diagram of the system illustrated in FIG. 4 according to at least one example embodiment.

FIG. 5 illustrates an example timing diagram of the system 100B of FIG. 4.

In particular, FIG. 5 shows an example timing relationship between the parameter selection signal SEL, the reset signal RST, and the first digital signal OUT1. According to at least one example embodiment, the parameter selection signal SEL indicates that a first candidate parameter (e.g., Parameter 1) has been selected at the parameter selector 145 in the DSP 110. In response to receiving the parameter selection signal SEL, the reset generator 135 generates and sends the reset signal RST to the CCO 115. In response to receiving the reset signal RST, the selector 140 selects the appropriate candidate parameter (e.g., from Iavg, Imax, Pavg, and Pmax) based on the parameter selection signal SEL and outputs a monitoring signal Smon that corresponds to the selected candidate parameter to the CCO 115. While the parameter selector 145 selects the appropriate candidate parameter, the reset generator 135 receives the parameter selection signal SEL and, in response, sends a reset signal (or pulse) RST to the CCO 115 that causes the CCO 115 to perform a reset operation. As shown in FIG. 5, the reset operation causes the CCO 115 to restart the first digital signal OUT1, which has a frequency that is representative of Parameter 1 (output from the selector 140 as monitoring signal Smon), at a falling edge of a pulse of the reset signal RST.

The above described timing is repeated upon selection of a second candidate parameter (e.g., Parameter 2) by the parameter selector 145.

In view of FIGS. 4 and 5, it should be appreciated that multiple candidate parameters (e.g., monitoring currents or powers) can be sensed with one frequency interconnection by multiplexing the input of the CCO 115. One or more digital or multilevel signals from the DSP 110 can be used to select the desired candidate parameter for conversion. To optionally decrease conversion time especially for low current (or low frequency) signals, with every change of selection, the CCO 115 can be restarted by the internally generated reset signal RST and start a new conversion in a defined way. By implementing the reset operation, the conversion time for low frequencies can be reduced by up to a factor of two.

Figure 6:
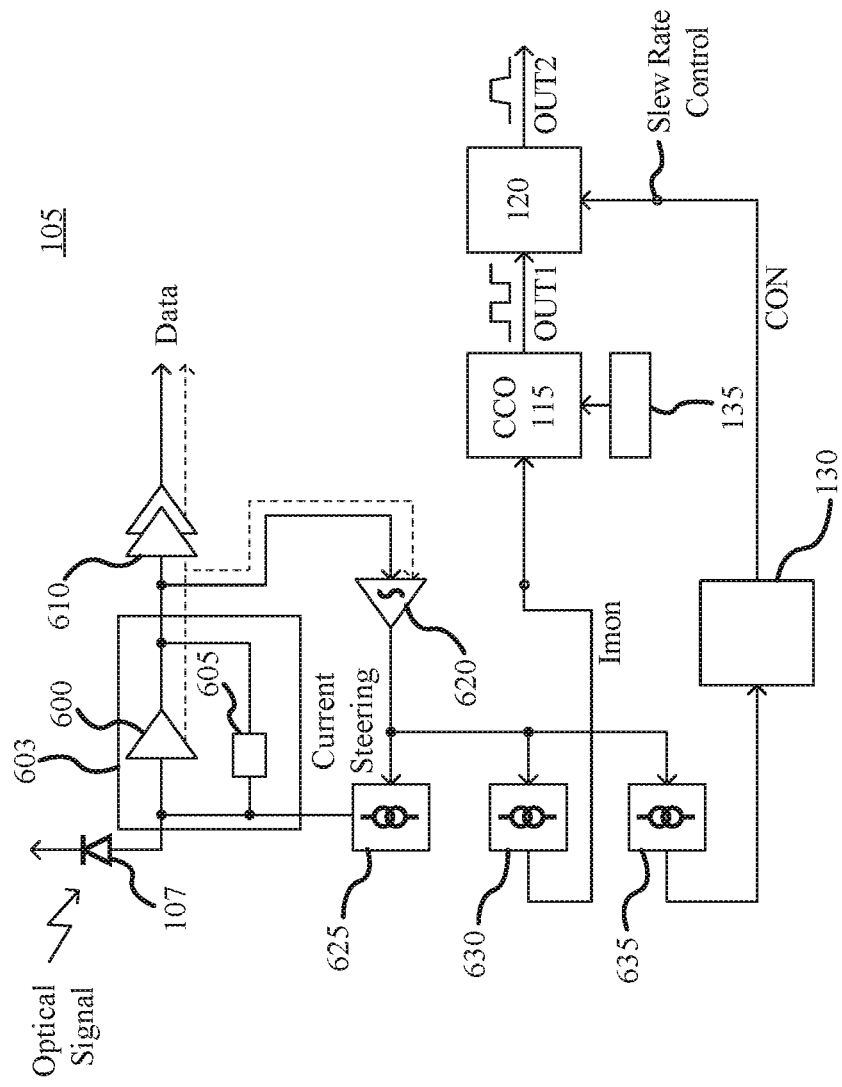
FIG. 6 illustrates an example structure of the systems in FIGS. 2-4 according to at least one example embodiment.

FIG. 6 illustrates an example structure of the receiver 105 shown in FIGS. 2-4. That is, FIG. 6 illustrates an example that includes the function generator 130 of FIG. 3 and the reset generator 135 of FIG. 4.

FIG. 6 illustrates a transimpedance amplifier (TIA) 603 with background light cancellation and a current source 625 connected to the photo detector 107. The TIA comprises an amplifier 600 and a resistive element 605. The TIA 603 may convert a current generated by the photo detector 107 into a voltage and output the voltage to an amplifier/driver 610 and a sequencing integrator 620. The dashed line entering the sequencing integrator 620 may correspond to a differential. The amplifier/driver 610 may be a singled ended or a differential amplifier/driver that outputs a data signal DATA that is representative of the light detected by the photo detector 107. The data signal DATA may be used by external circuitry, such as the DSP 110, to generate an image based on the detected light. It should be appreciated that the path from the photo detector 107 to through the amplifier/driver 610 is a fast path to output the data signal DATA while path from the photo detector 107 through the slew rate controller 120 is a monitoring path for monitoring an optical signal of the photo detector 107. The sequencing integrator 620 integrates the signal output by the TIA 603 and outputs an integrated signal to steer a plurality of current sources 625, 630, and 635.

The sequencing integrator 620 controls the average output of the TIA 603 with the help of the current source 625 by subtracting the average current from the photo detector 107 to adapt to various optical power levels. By replicating this current to the current controlled oscillator 115 and to the slew rate controller 120, the proposed monitoring function can be realized.

Each of the current sources 625, 630, and 635 is associated with a type of sensing. For example, current source 625 is for fine sensing or monitoring, current source 630 is for medium sensing or monitoring (between fine and coarse), and current source 635 is for coarse sensing or monitoring. Current sources 625, 630, and 635 are employed in sequence to provide a high dynamic range and to accurately replicate the current for the monitoring and slew rate control, since a simple current mirror has a limited dynamic range that limits accuracy. These three current sources 625, 630, 635 are shown to be internally split to several paths. In some embodiments, the current sources 625, 630, 635 are staggered from weak to strong and are activated dependent on the value of the current. This staggering function can be performed by the sequencing integrator 620. The reason for that is that CMOS Technology enables good matching for current mirrors in a limited range. By staggering the current matching between the sources 620, 625, 630, improved matching can be achieved over any dynamic range. Although FIG. 6 illustrates three current sources, example embodiments are not limited thereto and it should be understood that any number of (e.g., N number current sources) current sources can be employed to accomplish varying degrees of sensing or monitoring.

An output of the current source 630 is connected to the CCO 115 along with an output of the reset generator 135 that generates the reset signal RST. Here, the output of current source 630 may correspond to a signal to be monitored (e.g., the analog signal Imon in FIGS. 2 and 3 or Smon in FIG. 4). The CCO 115 may be reset to a start condition by reset signal RST to make a defined measurement when the monitored current is low to improve measurement speed. An output of the current source 635 is connected to the function generator 130, which generates control signal CON to control the slew rate controller 120.

As described with respect to FIGS. 2-5, the CCO 115 converts the analog signal from current source 635 into the first digital signal OUT1 that has a frequency representative of the amplitude of the analog signal. According to at least one example embodiment, the slew rate controller 120 is included and controls a slew rate of the first digital signal OUT1 according to the control signal CON, and outputs the second digital signal OUT2 that still has a frequency representative of the amplitude of the analog signal but with an adjusted slew rate. That is, the optional function generator 130 can influence the monitoring to slew-rate relation to fulfill desired EMI requirements simultaneously with possible restrictions from an external receiving device to count the value (e.g., maximum slew rate limitation).

Figure 7:
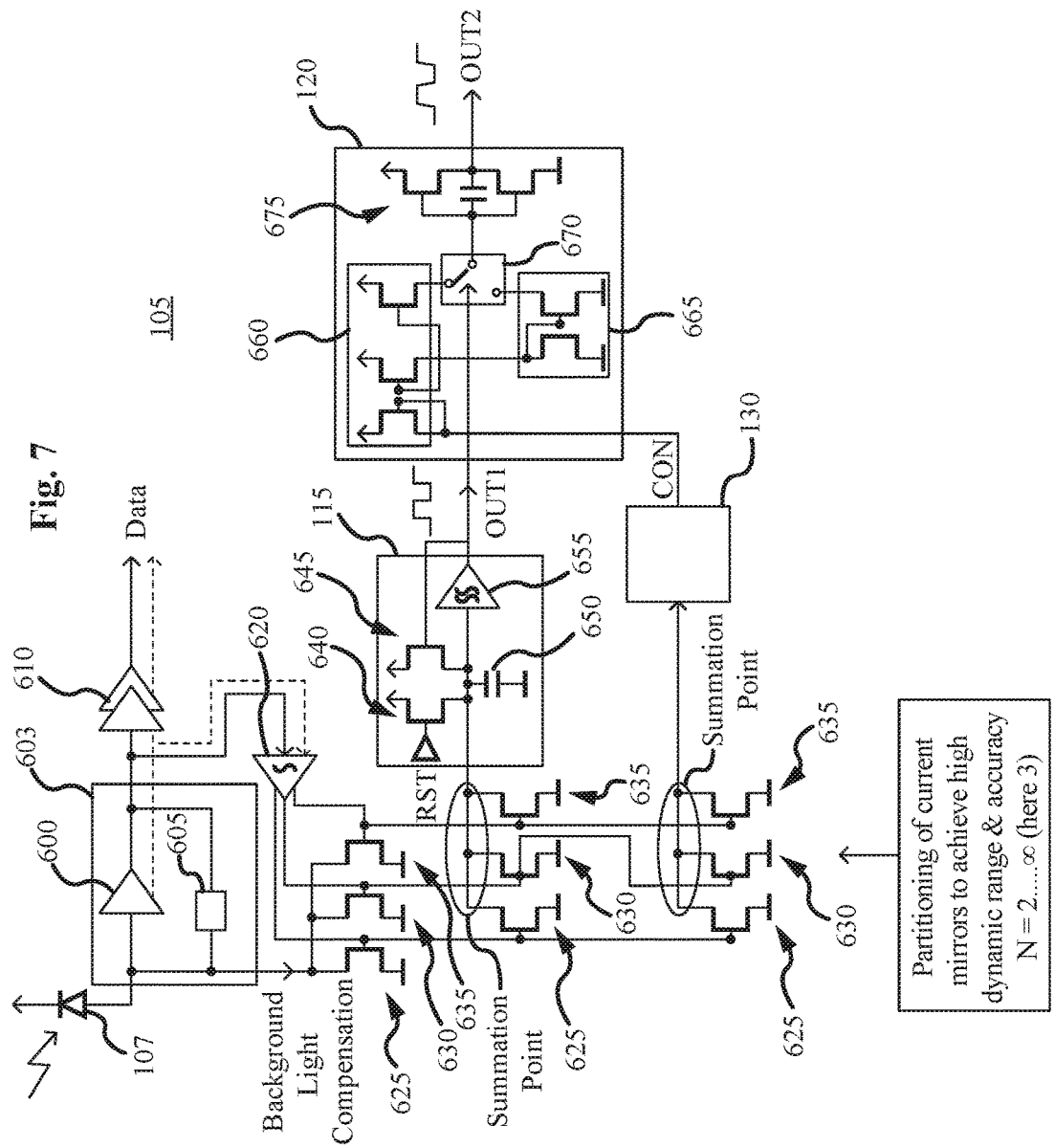
FIG. 7 illustrates details of the example structure in FIG. 6 according to at least one example embodiment.

FIG. 7 illustrates the receiver of FIG. 6 in further detail. For example, FIG. 7 illustrates example implementations of the current sources 635, 630, and 635, the CCO 115, and the slew rate controller 120 in FIG. 6.

As shown in FIG. 7, the current sources 625, 630, and 635 may be a plurality of current mirrors. FIG. 7 illustrates two current summation points for the plurality of current mirrors: a first point at an input of the CCO 115; and a second point at an input of the function generator 130.

The CCO 115 may convert the analog current signal at the first point with a Schmitt trigger oscillator 655. In FIG. 7, the reset signal RST from reset generator 135 may be input to a gate of a transistor 640 that is connected between an input of the oscillator 655 and a power supply voltage (not shown). An output of the oscillator 655 is fed back to the input of the oscillator 655 through transistor 645 that is connected between the input of the oscillator 655 and the power supply voltage. A capacitive element 650 may be connected between the input of the oscillator 655 and a common voltage (e.g., a ground voltage).

The slew rate controller 120 may include a first current mirror 660 connected between function generator 130 (to receive the control signal CON) and a switch 670. The slew rate controller 120 may include a second current mirror 665 connected between the first current mirror 660. The slew rate controller 120 further includes a switch 670 that switches between an output of the first current mirror 660 and an output of the second current mirror 665. The slew rate controller 120 includes an integrator 675 that shapes the waveform of second output signal OUT2 based on the parameter being monitored. The integrator 675 accomplishes this by monitoring the dependent current mirror 665 for rising and falling edges and outputting the second digital signal OUT2.

Figure 8:
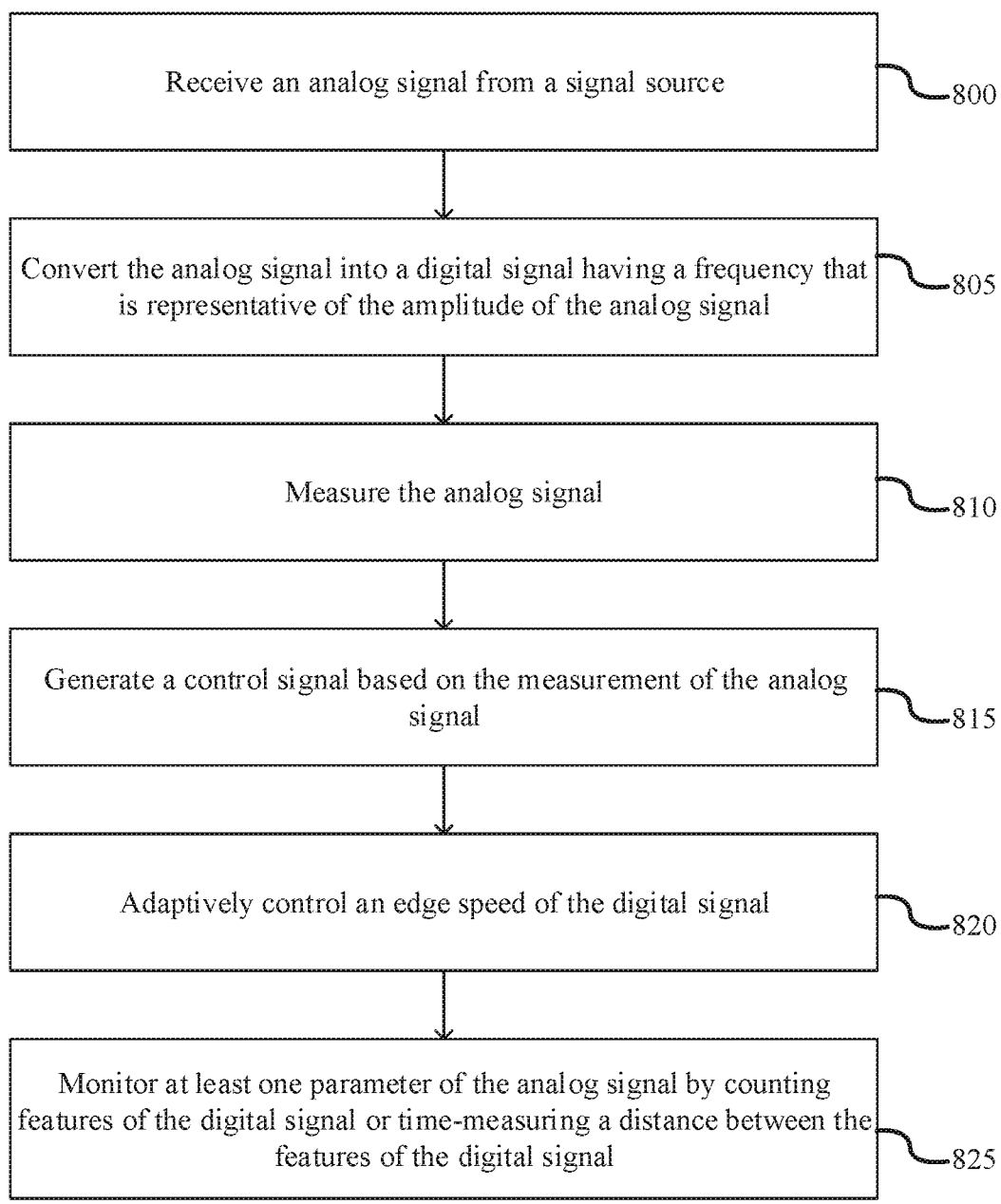
FIG. 8 illustrates example operations of the systems illustrated in FIGS. 2-4 according to at least one example embodiment.

FIG. 8 illustrates example operations of the systems illustrated in FIGS. 2-4.

In operation 800, the receiver 105 receives an analog signal (e.g., current signal Imon) from a signal source (e.g., an optoelectronic component, such as the photo detector 107). The analog signal may correspond to an electrical signal produced by photo detector 107 in response to incident light.

In operation 805, the receiver 105 converts the analog signal into a digital signal (e.g., first digital signal OUT1) having a frequency that is representative of an amplitude of the analog signal (e.g., a current amplitude). For example, the analog signal is converted to the digital signal by the CCO 115.

In operation 810, the function generator 130 of the receiver 105 measures the analog signal. For example, the function generator 130 measures the amplitude of the analog signal.

In operation 815, the function generator 130 generates a control signal CON based on the measurement of the analog signal. The control signal CON enables adaptive control of the edge speed of the digital signal (e.g., first digital signal OUT1). The control signal CON is a current, which defines a charging current for a capacitor, which effectively defines the Slew rate.

In operation 820, the slew rate controller 120 adaptively controls an edge speed of the first digital signal OUT1 and outputs a second digital signal OUT2.

In operation 825, the feature monitor 125 of the DSP 110 monitors at least one parameter of the analog signal by counting features of the digital signal (e.g., first digital signal OUT1) or time-measuring a distance between the features of the digital signal. The features of the digital signal may correspond to individual pulses of the digital signal. For example, the feature monitor 125 counts a number of the individual pulses or tracks a time (e.g., average time) between the individual pulses over a desired time period. The feature monitor 125 may employ a lookup table (LUT) to match the counted number of pulses or time between the pulses to an expected value of the at least one parameter of the analog signal, thereby allowing the DSP 110 to monitor the at least one of the analog signal. By way of example, the feature monitor 125 may determine from the LUT that the counted number of pulses or time between the pulses corresponds to a particular current amplitude of the analog signal. It should be appreciated that employing the LUT provides controlled flexibility to map a monitored parameter to its physical quantity even if the relation is nonlinear. Alternatively, the feature monitor 125 may employ linear regression coefficients (e.g., if the relationship between a monitored parameter and its physical quantity is linear), or an algebraic equation derived from statistical analysis on the physical quantity and various external factors such as temperature, humidity, lifetime to establish relationship between monitored parameter and ideal value.

According to at least one example embodiment, the above described monitoring process for an optical signal may be used to check and control link and signal quality of the optical signal incident to the photodetector 107. This may ensure error free data transmission, for example, if the monitoring system is employed in the context of a fiber-optic communication network, and provide early warning/alarm of possible critical failures and/or maintenance needs for the network.

Figure 9:
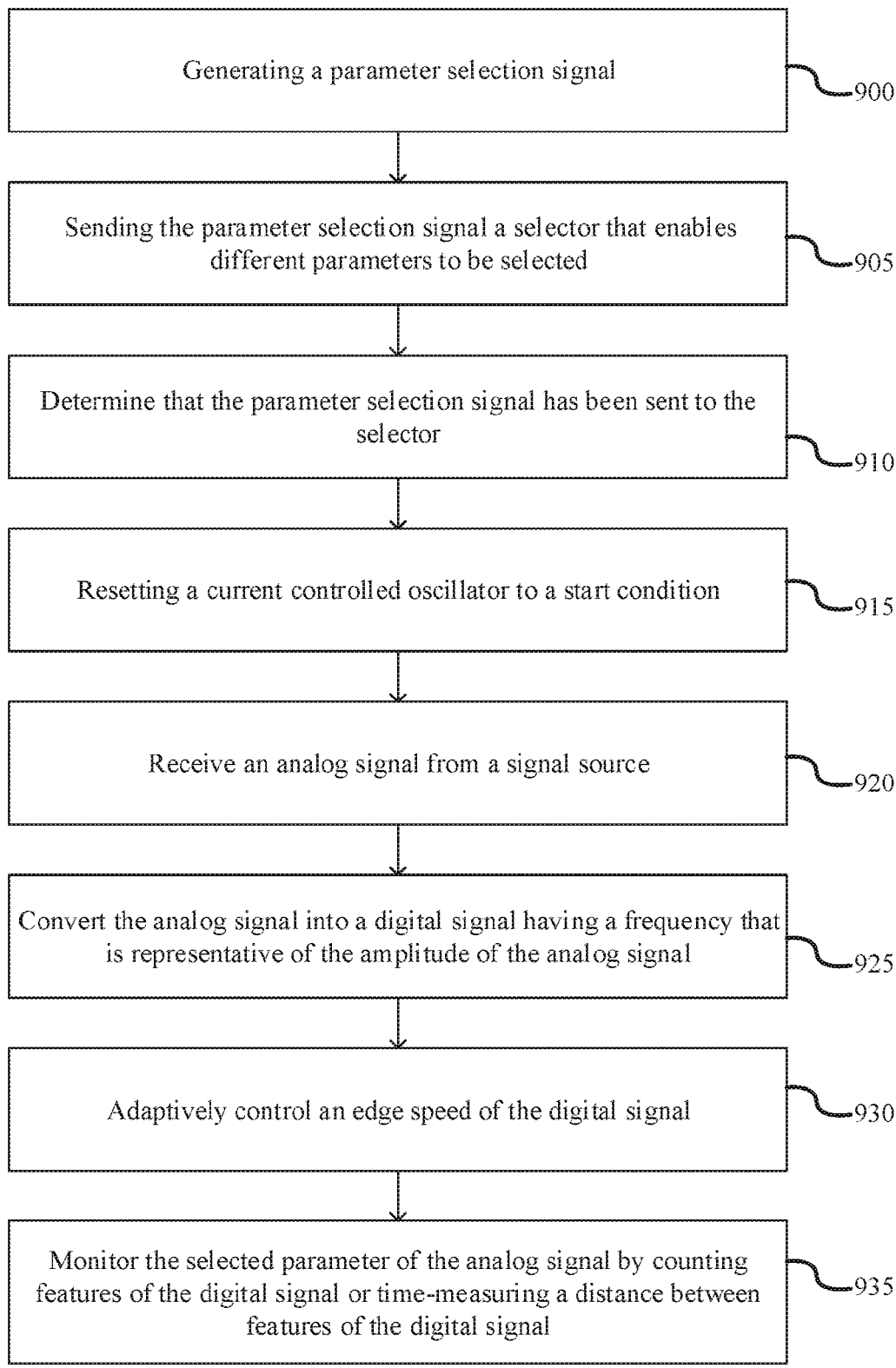
FIG. 9 illustrates additional example operations of the systems illustrated in FIGS. 2-4 according to at least one example embodiment.

FIG. 9 illustrates example operations of the systems illustrated in FIGS. 2-4.

According to at least one example embodiment, the at least one parameter described with respect to FIG. 8 corresponds to a selected parameter from among a plurality of candidate parameters. As described with reference to FIG. 4, the plurality of candidate parameters comprise two or more of an average current of the analog signal, a maximum current of the analog signal, an average power of the analog signal, and a maximum power of the analog signal.

Thus, in operation 900, the parameter selector 145 generates a parameter selection signal SEL. The parameter selection signal SEL may be generated in response to user input to the DSP 110 or in response to a programmed trigger in the DSP 110. For example, the DSP 110 may be programmed to sequentially select (or cycle through) the plurality of candidate parameters so that each candidate parameter is monitored in sequence. The DSP 110 may send the parameter selection signal SEL over any suitable serial bus and protocol.

In operation 905, the parameter selector 145 sends the parameter selection signal SEL to the selector 140 that enables different parameters from among the plurality of candidate parameters to be selected as the selected parameter.

In operation 910, the receiver 105 determines that the parameter selection signal SEL has been sent to the selector 140.

In operation 915, in response to determining that the parameter selection signal has been sent, the receiver 105 resets the current controlled oscillator 115 to a start condition. It should be understood that reset generator 135 may perform operations 910 and 915.

Operations 920, 925, 930, and 935 are substantially the same as operations 800, 805, 820, and 825, respectively. Accordingly, these operations are not discussed in detail here.

Figure 10:
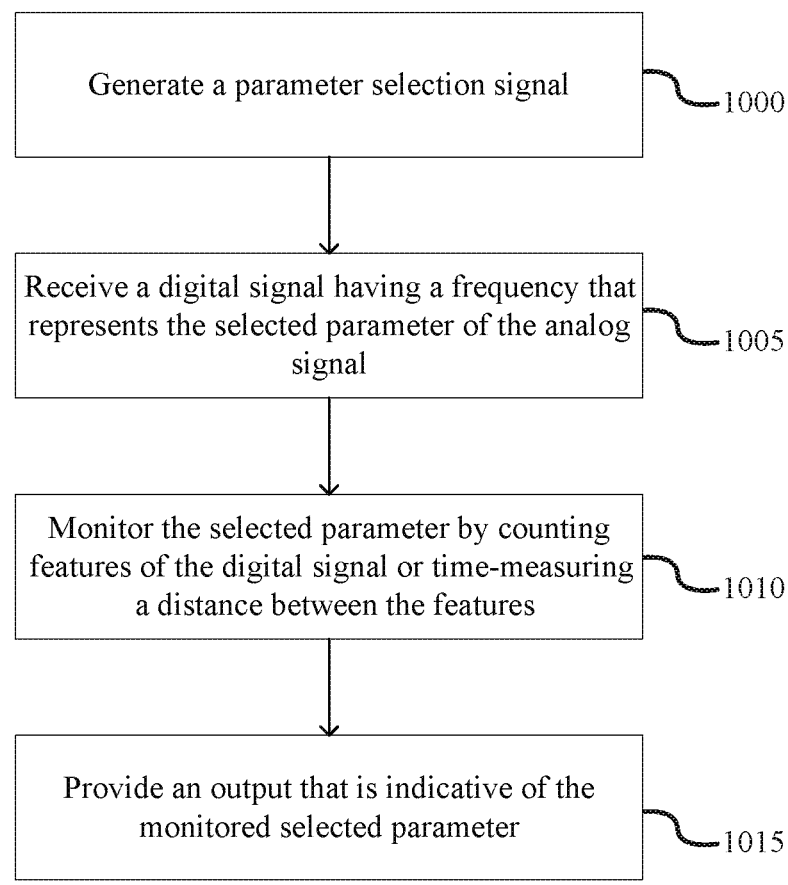
FIG. 10 illustrates example operations of the digital signal processor in FIGS. 2-4.

FIG. 10 illustrates example operations of the digital signal processor 110 in FIGS. 2-4. According to at least one example embodiment, the DSP 110 includes a computer readable medium, such as a nonvolatile memory, that includes instructions that cause the DSP to perform the operations illustrated in FIG. 10.

For example, the computer readable medium includes instructions that cause the DSP 110 to generate a parameter selection signal SEL in operation 1000. As described above with reference to FIG. 9, the parameter selection signal SEL may enable different parameters from among a plurality of candidate parameters of an analog signal to be selected as a selected parameter.

The computer readable medium includes instructions that cause the DSP 110 to receive a digital signal having a frequency that represents the selected parameter of the analog signal in operation 1005. For example, the DSP 110 receives the digital signal OUT2 from receiver 105.

The computer readable medium includes instructions that cause the DSP 110 to monitor the selected parameter of the analog signal by counting features of the digital signal or time-measuring a distance between the features of the digital signal in operation 1010. For example, the DSP 110 performs operation 1010 in the same or similar manner as operation 825 from FIG. 8.

The computer readable medium includes instructions that cause the DSP 110 to provide an output to an external processor that is indicative of the monitored selected parameter of the analog signal in operation 1015. The external processor may use the monitored selected parameter in further processing operations.

In view of the foregoing description, it should be appreciated that example embodiments provide improved devices and methods for monitoring an optical link.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of monitoring a signal source, the method comprising:
 receiving an analog signal from the signal source;
 converting the analog signal into a digital signal having a frequency that is representative of an amplitude of the analog signal;
 adaptively controlling an edge speed of the digital signal based on the analog signal; and
 monitoring at least one parameter of the analog signal by counting features of the digital signal or time-measuring a distance between the features of the digital signal.

2. The method of claim 1, further comprising:
 measuring the analog signal; and
 generating a control signal based on the measurement of the analog signal, wherein the control signal enables the adaptive control of the edge speed of the digital signal.

3. The method of claim 1, wherein the analog signal is converted to the digital signal with a current controlled oscillator.

4. The method of claim 1, wherein the at least one parameter corresponds to a selected parameter from among a plurality of candidate parameters, the method further comprising:
 generating a parameter selection signal; and
 sending the parameter selection signal to a selector that enables different parameters from among the plurality of candidate parameters to be selected as the selected parameter.

5. The method of claim 4, wherein the plurality of candidate parameters comprise two or more of an average current of the analog signal, a maximum current of the analog signal, an average power of the analog signal, and a maximum power of the analog signal.

6. The method of claim 4, wherein a current controlled oscillator converts the analog signal to the digital signal, the method further comprising:
 determining that the parameter selection signal has been sent to the selector; and
 in response to determining that the parameter selection signal has been sent, resetting the current controlled oscillator to a start condition.

7. The method of claim 4, wherein the selector comprises a multiplexer.

8. The method of claim 1, wherein the signal source comprises an optoelectronic component.

9. A system for monitoring a signal source, the system comprising:
 a receiver comprising:
  a current controlled oscillator that converts an input analog signal into a digital signal having a frequency that represents a parameter of the analog signal; and
  a slew-rate controller that adaptively controls an edge speed of the digital signal based on the analog signal; and
 a digital signal processor that receives the digital signal and monitors the parameter of the analog signal by counting features of the digital signal or time-measuring a distance between features of the digital signal.

10. The system of claim 9, wherein the receiver further comprises:
 a function generator that measures the analog signal and provides a control signal to the slew rate controller based on the measurement of the analog signal, wherein the control signal enables the slew-rate control driver to adaptively control the edge speed of the digital signal.

11. The system of claim 9, wherein the digital signal processor generates a parameter selection signal that is sent to the receiver and is used by the receiver to select the monitored parameter from among a plurality of candidate monitored parameters.

12. The system of claim 11, further comprising:
 a multiplexer that receives the parameter selection signal and, based thereon, selectively controls which among the plurality of candidate monitored parameters is the selected monitored parameter.

13. The system of claim 12, wherein the plurality of candidate monitored parameters comprise two or more of an average current of the analog signal, a maximum current of the analog signal, an average power of the analog signal, and a maximum power of the analog signal.

14. The system of claim 11, wherein the signal source comprises an optoelectronic component.

15. A non-transitory computer readable medium comprising instructions, which when executed by a processor, cause the processor to:
 generate a parameter selection signal, the parameter selection signal enabling different parameters from among a plurality of candidate parameters of an analog signal to be selected as a selected parameter;
 receive a digital signal having a frequency that represents the selected parameter of the analog signal, the digital signal having an edge speed that has been adaptively controlled based on the analog signal; and
 monitor the selected parameter of the analog signal by counting features of the digital signal or time-measuring a distance between the features of the digital signal.

16. The computer readable medium of claim 15, including further instructions that cause the processor to provide an output to an external processor that is indicative of the monitored selected parameter of the analog signal.

17. The computer readable medium of claim 15, wherein parameter selection signal is generated in response to user input.

18. The computer readable medium of claim 15, wherein the plurality of candidate parameters comprise two or more of an average current of the analog signal, a maximum current of the analog signal, an average power of the analog signal, and a maximum power of the analog signal.

19. The method of claim 1, further comprising:
 providing an output that is indicative of the monitored at least one parameter of the analog signal.

20. The method of claim 1, wherein the receiving, converting, and adaptively controlling are performed by a receiver, and the monitoring is performed by a digital signal processor separate from the receiver.

* * * * *